United States Patent
Liu et al.

(10) Patent No.: US 12,259,613 B2
(45) Date of Patent: Mar. 25, 2025

(54) BACKLIGHT MODULE AND DISPLAY DEVICE

(71) Applicant: Shanghai Tianma Micro-Electronics Co., Ltd., Shanghai (CN)

(72) Inventors: Chunfeng Liu, Shanghai (CN); Ronghua Li, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 0 days.

(21) Appl. No.: 18/408,816

(22) Filed: Jan. 10, 2024

(65) Prior Publication Data

US 2024/0142821 A1 May 2, 2024

(30) Foreign Application Priority Data

Jun. 5, 2023 (CN) .......................... 202310655288.5

(51) Int. Cl.
*G02F 1/13357* (2006.01)

(52) U.S. Cl.
CPC .. *G02F 1/133606* (2013.01); *G02F 1/133603* (2013.01); *G02F 1/133608* (2013.01)

(58) Field of Classification Search
CPC ......... G02F 1/133504; G02F 1/133606; G02F 1/133608; G02F 1/133603
See application file for complete search history.

(56) References Cited

U.S. PATENT DOCUMENTS

| 9,146,344 B1* | 9/2015 | Song ................... G02B 6/0085 |
| 2020/0110213 A1* | 4/2020 | Shiba ................... G02B 6/0051 |
| 2020/0285115 A1* | 9/2020 | Ito ..................... G02F 1/133611 |

FOREIGN PATENT DOCUMENTS

| CN | 106773315 A | 5/2017 |
| CN | 216411628 U | 4/2022 |
| CN | 217333068 U | 8/2022 |

OTHER PUBLICATIONS

Chinese Office Action mailed on Dec. 13, 2024, issued in Chinese Application No. 202310655288.5, filed on Jun. 5, 2024; 17 pages.

* cited by examiner

*Primary Examiner* — Karabi Guharay
(74) *Attorney, Agent, or Firm* — CHRISTENSEN O'CONNOR JOHNSON KINDNESS PLLC

(57) ABSTRACT

The present disclosure relates a backlight module and a display device to improve surface uniformity of the backlight module. The backlight module includes: a first region and a second region surrounding the first region; a backplate; a light source located at a side of the backplate pointing to a light exiting direction of the backlight module and also located in the first region; and a first structure located at a side of the light source away from the backplate, where the first structure includes scattering dots; where the scattering dots are located in the first region and the second region, and within a unit projected area, an area of orthographic projection of the scattering dots in the first region is smaller than an area of orthographic projection of the scattering dots in the second region, or the scattering dots are located in the second region.

19 Claims, 10 Drawing Sheets

BACKLIGHT MODULE AND DISPLAY DEVICE

CROSS-REFERENCE TO RELATED APPLICATIONS

The present application claims priority to Chinese Patent Application No. 202310655288.5, filed on Jun. 5, 2023, the content of which is incorporated herein by reference in its entirety.

TECHNICAL FIELD

The present disclosure relates to the technical field of display, and in particular, to a backlight module and a display device.

BACKGROUND

A liquid crystal display panel displays images by using liquid crystals and a principle of electric torsion. However, because liquid crystal molecules do not emit light, a backlight module needs to be disposed to provide backlight. According to arrangement positions of light sources in current backlight modules, the backlight modules may be divided into edge-lit and direct-lit backlight modules. With the continuous development of large-scale display and the local dimming technology, direct-lit backlight modules have become the focus of development currently.

However, edge brightness of the existing direct-lit backlight module is relatively low, adversely affecting a display effect of the liquid crystal display panel.

SUMMARY

In view of this, embodiments of the present disclosure provide a backlight module and a display device to improve surface uniformity of the backlight module.

According to a first aspect, the present disclosure provides a backlight module, including a first region, a second region surrounding the first region, a backplate, a light source, and a first structure. In an embodiment, the light source is located at a side of the backplate pointing to a light exiting direction of the backlight module and also located in the first region. In an embodiment, the first structure is located at a side of the light source away from the backplate, where the first structure includes scattering dots.

The scattering dots are located in the first region and the second region, and within a unit projected area, an area of orthographic projection of the scattering dots in the first region is smaller than an area of orthographic projection of the scattering dots in the second region, or the scattering dots are located in the second region.

According to another aspect, the present disclosure provides a display device, including a liquid crystal display panel and the foregoing backlight module.

BRIEF DESCRIPTION OF DRAWINGS

To describe the technical solutions in the embodiments of the present disclosure more clearly, the following briefly describes the accompanying drawings required to be used in the embodiments. Apparently, the accompanying drawings in the following description show merely some embodiments of the present disclosure, and a person of ordinary skill in the art may still derive other accompanying drawings from these accompanying drawings without creative efforts.

DESCRIPTION OF EMBODIMENTS

For the sake of a better understanding of the technical solutions of the present disclosure, the embodiments of the present disclosure are described in detail below with reference to the accompanying drawings.

It should be noted that the embodiments in the following descriptions are merely some rather than all of the embodiments of the present disclosure. All other embodiments obtained by a person of ordinary skill in the art on the basis of the embodiments of the present disclosure without creative efforts shall fall within the protection scope of the present disclosure.

Terms used in the embodiments of the present disclosure are only for the purpose of describing specific embodiments, and are not intended to limit the present disclosure. Unless otherwise specified in the context, words, such as "a", "the", and "this", in a singular form in the embodiments of the present disclosure and the appended claims include plural forms.

It should be understood that the term "and/or" in this specification merely describes associations between associated objects, and it indicates three types of relationships. For example, A and/or B may indicate that A exists alone, A and B coexist, or B exists alone. In addition, the character "/" in this specification generally indicates that the associated objects are in an "or" relationship.

The inventor found through research that, in the existing direct-lit backlight module, due to impact of a position of a light source, a light type of the light source, an optical distance, and other factors, the light exit brightness at an edge position is obviously lower than light exit brightness at a middle position.

Figure 1:
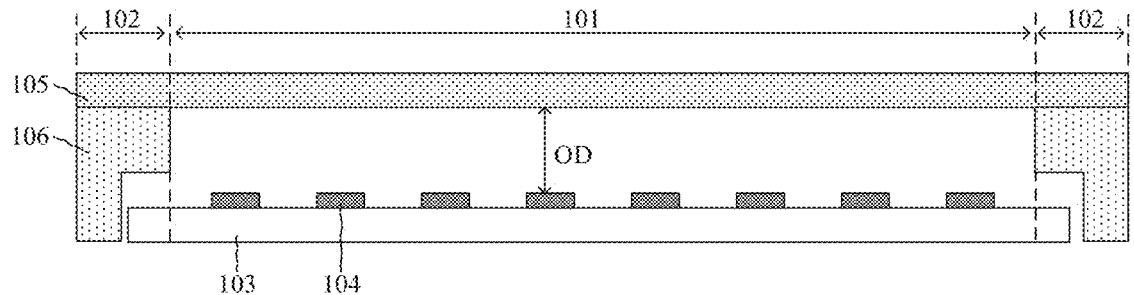
FIG. 1 is a schematic structural diagram of a backlight module in the prior art.
Figure 2:
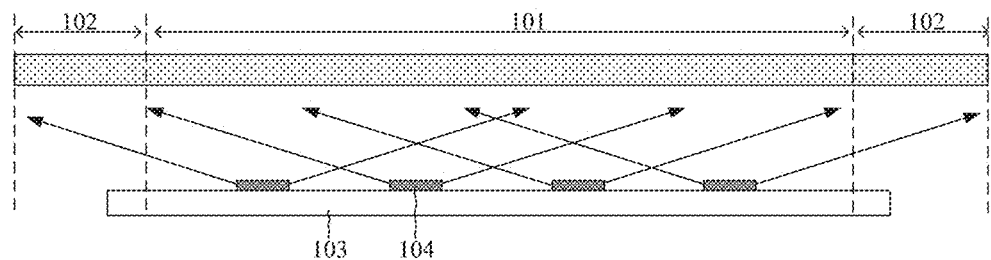
FIG. 2 is a schematic light ray transmission diagram of a backlight module in the prior art.

FIG. 1 is a schematic structural diagram of a backlight module in the prior art, and FIG. 2 is a schematic light ray transmission diagram of a backlight module in the prior art. The backlight module includes a first region 101 and a second region 102. The first region 101 corresponds to a display region of a liquid crystal display panel. The backlight module further includes a backplate 103, a light source 104 located at one side of the backplate 103, and a diffusion plate 105 located at one side of the light source 104 away from the backplate 103.

Usually, the outermost light source 104 is not disposed immediately close to an edge of the backplate 103, but is spaced apart from the edge of the first region 101 by a particular distance. In this way, light that is emitted by the light source 104 and that can be transmitted to the edge position of the first region 101 is reduced.

In addition, considering the production costs, the light source 104 may not be arranged extremely densely. That is, there is a relatively large interval between the light source 104. In this case, the diffusion plate 105 needs to be supported on a support structure 106 to have an optical distance (OD) from the light source 104. In this way, the light emitted by the light source 104 may be uniformly mixed within the optical distance first and then enter the diffusion plate 105, to prevent human eyes from seeing individual light sources 104 one by one.

When there is an optical distance in the backlight module, because a light exit angle of the light source 104 may be relatively small, light that can be finally emitted at the edge position of the first region 101 is reduced, causing light exit brightness of the backlight module at the edge position of the first region 101 to be obviously low. For example, light exit brightness of the backlight module at a middle position of the first region 101 may reach about 90%, but light exit brightness at the edge position of the first region 101 can reach only about 55%, resulting in poor surface uniformity of the backlight module.

Figure 3:
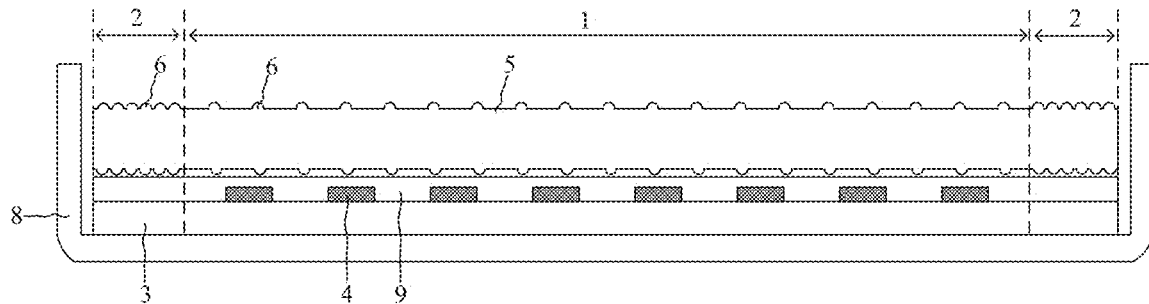
FIG. 3 is a schematic structural diagram of a backlight module according to an embodiment of the present disclosure.
Figure 4:
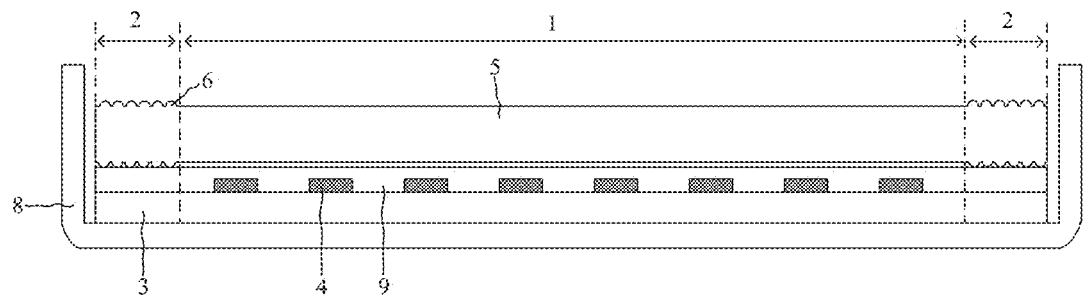
FIG. 4 is another schematic structural diagram of a backlight module according to an embodiment of the present disclosure.

In view of this, an embodiment of the present disclosure provides a backlight module. FIG. 3 is a schematic structural diagram of a backlight module according to an embodiment of the present disclosure, and FIG. 4 is another schematic structural diagram of a backlight module according to an embodiment of the present disclosure. The backlight module includes a first region 1 and a second region 2 surrounding the first region 1. The first region 1 is a region in the backlight module that corresponds to a display region of a liquid crystal display panel. In a direction perpendicular to a plane of a display device, the first region 1 of the backlight module may overlap the display region of the liquid crystal display panel, light emitted by the backlight module in the first region 1 is further incident to the display region of the liquid crystal display panel, and then screen display is achieved in cooperation with liquid crystal flipping. The second region 2 corresponds to a frame region of the liquid crystal display panel.

The backlight module further includes a backplate 3, a light source 4, and a first structure 5. The light source 4 is located at a side of the backplate 3 pointing to a light exiting direction of the backlight module and also located in the first region 1. In this embodiment of the present disclosure, the light source 4 may include a light emitting diode (LED), for example, a white light LED or a blue light LED. The first structure 5 is located at a side of the light source 4 away from the backplate 3.

It should be noted that, in this embodiment of the present disclosure, that the first structure 5 is located at a side of the light source 4 away from the backplate 3 is intended to describe an upper and lower positional relationship between the two functional film layers: the first structure 5 and the light source 4. That is, a formation sequence of the two functional film layers, and does not necessarily mean that the first structure 5 needs to overlap with all the light sources 4. For example, referring to FIG. 3 and FIG. 4, the first structure 5 may overlap all the light sources 4, or referring to FIG. 13, the first structure 5 may alternatively overlap some of the light sources 4, or referring to FIG. 12, the first structure 5 may alternatively be located obliquely above the light source 4, and the first structure 5 does not overlap the light source 4.

The first structure 5 includes scattering dots 6. The scattering dots 6 can reflect and refract light. In one arrangement, referring to FIG. 3, the scattering dots 6 are located in the first region 1 and the second region 2, and within a unit projected area, an area of orthographic projection of the scattering dots 6 in the first region 1 is smaller than an area of orthographic projection of the scattering dots 6 in the second region 2. Alternatively, in another arrangement, referring to FIG. 4, the scattering dots 6 are located in the second region 2.

In this embodiment of the present disclosure, the scattering dots 6 are disposed in the first structure 5, so that a light transmission path can be adjusted by using impact of these scattering dots 6 on light, to increase an amount of light that can be finally emitted from the edge position of the first region 1.

Figure 5:
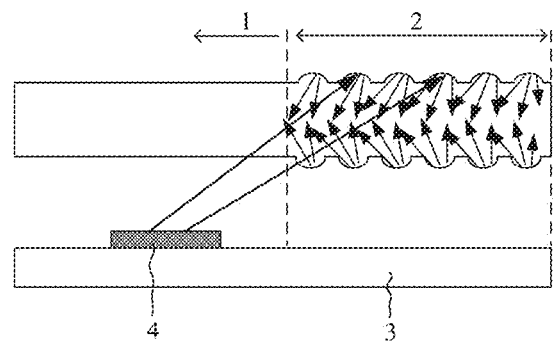
FIG. 5 is a schematic light ray transmission diagram of a backlight module according to an embodiment of the present disclosure.
Figure 6:
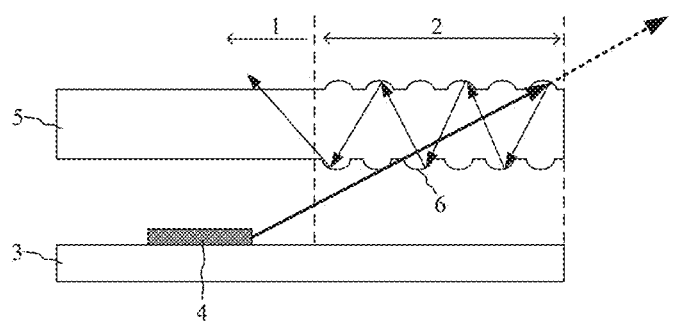
FIG. 6 is another schematic light ray transmission diagram of a backlight module according to an embodiment of the present disclosure.

Specifically, through the arrangement of the scattering dots 6 in a part of the first structure 5 located in the second region 2, as shown in FIG. 5 and FIG. 6, where FIG. 5 is a schematic light ray transmission diagram of a backlight module according to an embodiment of the present disclosure, and FIG. 6 is another schematic light ray transmission diagram of a backlight module according to an embodiment of the present disclosure. As shown, when light emitted by the light source 4 is incident to the part of the first structure 5 located in the second region 2, part of the light is reflected by the scattering dots 6, changing a transmission path thereof. The reflected light is further transmitted along a direction towards the first region 1, and finally can be emitted out from the edge position of the first region 1, thereby increasing the amount of light emitted from the edge position of the first region 1, and improving light exit brightness at the edge position of the first region 1.

Figure 7:
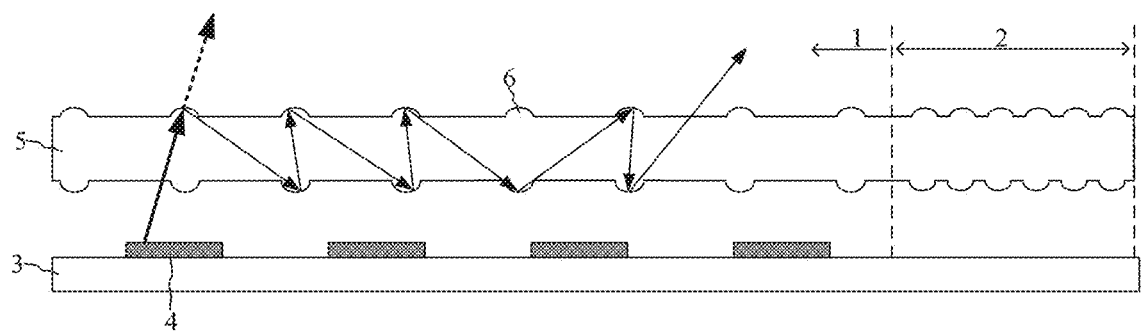
FIG. 7 is still another schematic light ray transmission diagram of a backlight module according to an embodiment of the present disclosure.

When a part of the first structure 5 located in the first region 1 is also provided with scattering dots 6, these scattering dots 6 can also be used to adjust light transmitted in the first region 1. For example, as shown in FIG. 7, FIG. 7 is still another schematic light ray transmission diagram of a backlight module according to an embodiment of the present disclosure, the scattering dots 6 in the first region 1 can reflect the light transmitted in the first region 1, change a light transmission path of the light, and enable part of the light that would not be emitted from the edge position of the first region 1 to be emitted from the edge position of the first region 1, to further increase the amount of light emitted from the edge position of the first region 1.

Figure 8:
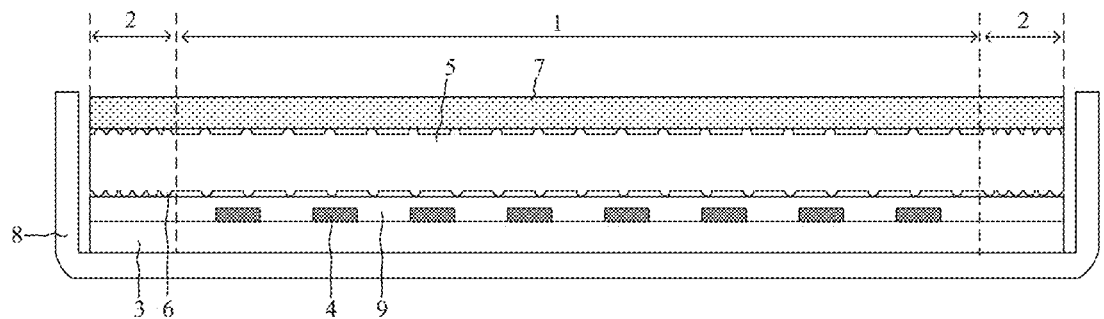
FIG. 8 is still another schematic structural diagram of a backlight module according to an embodiment of the present disclosure.

In addition, when the part of the first structure 5 located in the first region 1 is also provided with scattering dots 6, the scattering dots 6 in the first region 1 and the scattering dots 6 in the second region 2 are further differentially designed in the embodiments of the present disclosure. With reference to FIG. 3, in the embodiments of the present disclosure, the area of the orthographic projection of the scattering dots 6 in the first region 1 within the unit projected area is set to be smaller, so that while the scattering dots 6 within this region are used to adjust the light exit brightness at the edge position of the first region 1, the added scattering dots 6 can also be prevented from having too much impact on the original light transmission in the first region 1. For example, as shown in FIG. 8, when there is an optical distance between the diffusion plate 7 and the light source 4, the impact of the scattering dots 6 in the first region 1 on the original natural light mixing in the backlight module can be reduced to avoid occurrence of a halo.

In addition, referring to FIG. 3 and FIG. 4, the backlight module may further include a frame body 8. The backplate 3, the light source 4, and the first structure 5 are all disposed in an accommodating space of the frame body 8. In addition, a protective layer 9 covering the light source 4 is further provided on the side of the light source 4 away from the backplate 3, to package and protect the light source 4.

Figure 9:
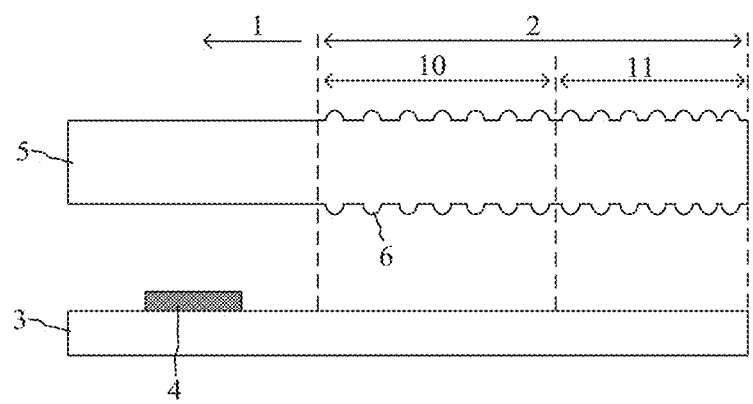
FIG. 9 is a partial schematic structural diagram of a backlight module according to an embodiment of the present disclosure.
Figure 10:
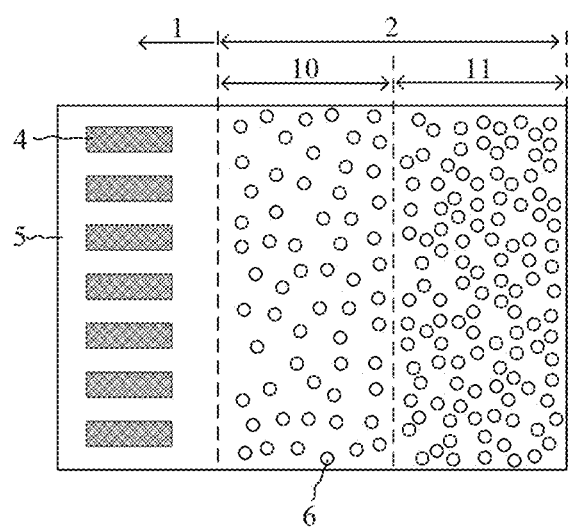
FIG. 10 is a partial top view of a backlight module according to an embodiment of the present disclosure.

FIG. 9 is a partial schematic structural diagram of a backlight module according to an embodiment of the present disclosure, and FIG. 10 is a partial top view of a backlight module according to an embodiment of the present disclosure. The second region 2 includes a first sub-region 10 and a second sub-region 11. The first sub-region 10 is located at a side of the second sub-region 11 close to the first region 1. In a direction perpendicular to a plane of the backlight module and within a unit projected area, an area of orthographic projection of the scattering dots 6 in the second sub-region 11 is larger than an area of orthographic projection of the scattering dots 6 in the first sub-region 10.

Compared with the first sub-region 10, the second sub-region 11 is farther away from the first region 1. Therefore, in the second sub-region 11, there is less light emitted by the light source 4. In addition, during transmission of the light reflected by the scattering dots 6 in the second sub-region 11 to the first region 1, the transmission path is relatively long, and an optical loss is very large. In view of this, in this embodiment of the present disclosure, the area of the orthographic projection of the scattering dots 6 in the second sub-region 11 within the unit projected area is set to be larger, for example, more scattering dots 6 are arranged within the unit area, so that a degree of adjustment of the light by the scattering dots 6 in the second sub-region 11 can be increased. For example, more light emitted from the light source 4 can be reflected, and the reflected light can be re-reflected for a plurality of times, and so on, thereby allowing more light to be transmitted in a direction towards the first region 1. In this way, even if there is a particular loss in the transmission process, it can be ensured that part of the light can be finally transmitted to the edge position of the first region 1 and then emitted out. In terms of the first sub-region 10 closer to the first region 1, because more light is emitted from the light source 4 in this region, the area of the orthographic projection of the scattering dots 6 in the first sub-region 10 within the unit projected area is set to be smaller. This avoids a bright line at the edge position of the first region 1 resulting from overcompensation for the light exit brightness at the edge position of the first region 1.

To sum up, in this embodiment of the present disclosure, scattering dots 6 in different regions of the second region 2 are differentially designed, so that light energy at different positions of the second region 2 can be re-allocated. This can effectively increase the light exit brightness at the edge position of the first region 1 without overcompensation for it, thereby optimizing a brightening effect.

In addition, in this embodiment of the present disclosure, both the first sub-region 10 and the second sub-region 11 are provided with scattering dots 6, so that the scattering dots 6 can be distributed at a plurality of positions in the second region 2, thereby enabling the scattering dots 6 to continuously adjust the light. For example, when the reflected light in the second sub-region 11 is transmitted towards the first region 1 to the first sub-region 10, it continues to be adjusted by the scattering dots 6 in the first sub-region 10. Such a continuous action of the scattering dots 6 on the light can strengthen the adjustment of the light, thereby enabling the light to be better transmitted towards the first region 1.

Further, referring to FIG. 9 again, in the direction perpendicular to the plane of the backlight module, along a direction from the first region 1 to the second region 2, and within the unit projected area, the area of the orthographic projection of the scattering dots 6 in the second region 2 gradually increases. In this case, the scattering dots 6 not only can continuously adjust the light within the entire second region 2, but also allows for uniform gradation of degrees of the adjustment of the light at different positions.

In a feasible implementation, referring to FIG. 8 again, the backlight module further includes a diffusion plate 7. The diffusion plate 7 is located at a side of the light source 4 away from the backplate 3. The first structure 5 is located between the diffusion plate 7 and the light source 4 and also located in the first region 1 and the second region 2.

In such an arrangement, an air layer of the optical distance between the diffusion plate 7 and the light source 4 is effectively used to accommodate the first structure 5. In this way, even if the first structure 5 is added, a thickness of the backlight module is not additionally increased. In addition, when the first structure 5 is arranged between the diffusion plate 7 and the light source 4, the first structure 5 can further replace the support structure to support the diffusion plate 7. Compared with a manner of using the support structure to support only edges of the diffusion plate 7, using the first structure 5 to support the diffusion plate 7 can stably support each position of the diffusion plate 7, thereby preventing the diffusion plate 7 from being damaged due to bending under action of an external force, and ensuring uniformity of the optical distance at different positions.

Figure 11:
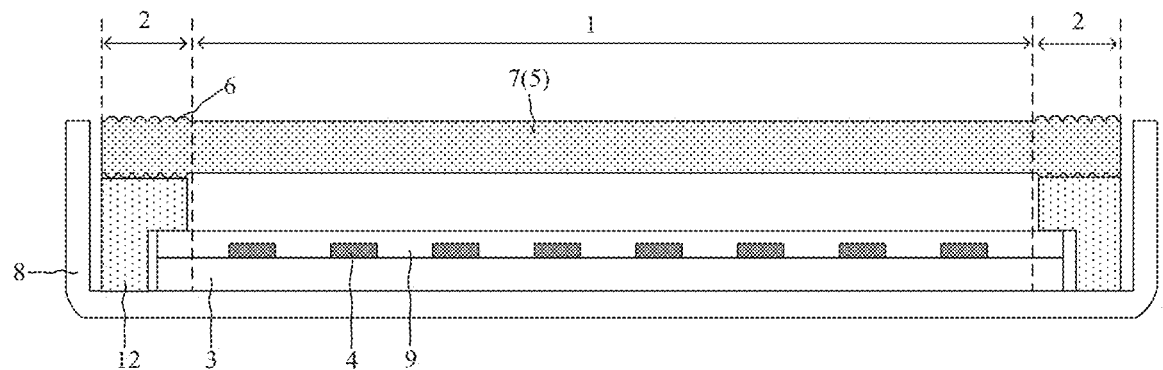
FIG. 11 is yet another schematic structural diagram of a backlight module according to an embodiment of the present disclosure.

FIG. 11 is yet another schematic structural diagram of a backlight module according to an embodiment of the present disclosure. The first structure 5 includes a diffusion plate 7. The diffusion plate 7 is located at a side of the light source 4 away from the backplate 3 and also located in the first region 1 and the second region 2.

In such an arrangement, the original diffusion plate 7 in the backlight module is reused as the first structure 5, so that there is no need to add another structure to the backlight module as the first structure 5, thereby reducing manufacturing costs. In addition, when there is an optical distance between the diffusion plate 7 and the light source 4, there is no need to arrange another film layer within the optical distance, thereby ensuring that the original natural light mixing is not affected.

It should be noted that, in the foregoing structure, a support structure 12 may also be provided in the second region 2 to support the diffusion plate 7.

Figure 12:
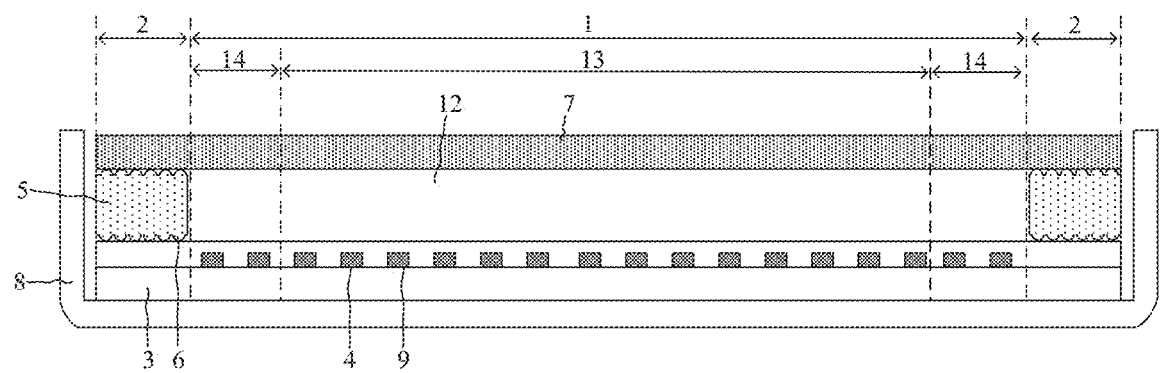
FIG. 12 is yet another schematic structural diagram of a backlight module according to an embodiment of the present disclosure.
Figure 13:
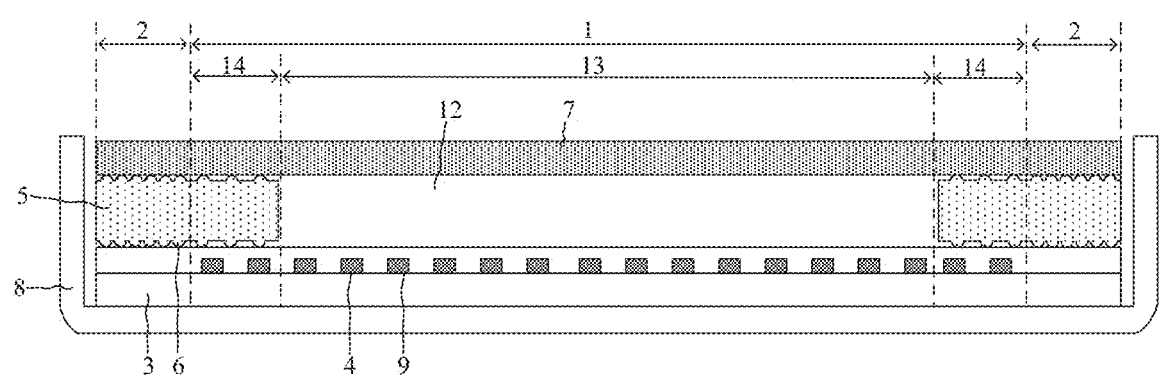
FIG. 13 is yet another schematic structural diagram of a backlight module according to an embodiment of the present disclosure.

FIG. 12 is yet another schematic structural diagram of a backlight module according to an embodiment of the present disclosure, and FIG. 13 is yet another schematic structural diagram of a backlight module according to an embodiment of the present disclosure. The first region 1 includes a middle region 13 and an edge region 14 surrounding the middle region 13. The backlight module further includes a diffusion plate 7. The diffusion plate 7 is located at a side of the light source 4 away from the backplate 3. The first structure 5 is located between the diffusion plate 7 and the backplate 3. In addition, the first structure 5 has a hollow portion 15, and the hollow portion 15 exposes the middle region 13.

For example, in one arrangement, referring to FIG. 12, the hollow portion 15 exposes the middle region 13 and the edge region 14. In this case, the scattering dots 6 are located only in the second region 2. Alternatively, in another arrangement, referring to FIG. 13, the hollow portion 15 exposes only the middle region 13, and the first structure 5 overlaps with the edge region 14. In this case, the scattering dots 6 may be located in both the edge region 14 and the second region 2. In such an arrangement, in a direction perpendicular to a plane of the backplate 3, the scattering dots 6 overlap the light source 4 in the edge region 14.

As described above, the first region 1 corresponds to the display region of the liquid crystal display panel. In this case, the middle region 13 in the first region 1 corresponds to a display region in the middle of the liquid crystal display panel, and there is a higher requirement on a display effect within the display region. In the foregoing structure, the hollow portion 15 is provided in the first structure 5 and the hollow portion 15 is caused to expose the middle region 13. In this regard, the first structure 5 does not fill the air layer of the optical distance in the middle region 13, and there is no impact on the original natural light mixing in the middle region 13. Consequently, the liquid crystal display panel has higher display quality in the display region in the middle. In addition, in such an arrangement, the first structure 5 can further replace the support structure to support the diffusion plate 7, so that there is no need to arrange any additional support structure in the backlight module.

It should be noted that, in this embodiment of the present disclosure when the first structure 5 includes scattering dots 6, the first structure 5 can be considered as a light guide plate design, and the scattering dots 6 can be specifically formed by laser engraving, printing, and other technologies.

Figure 14:
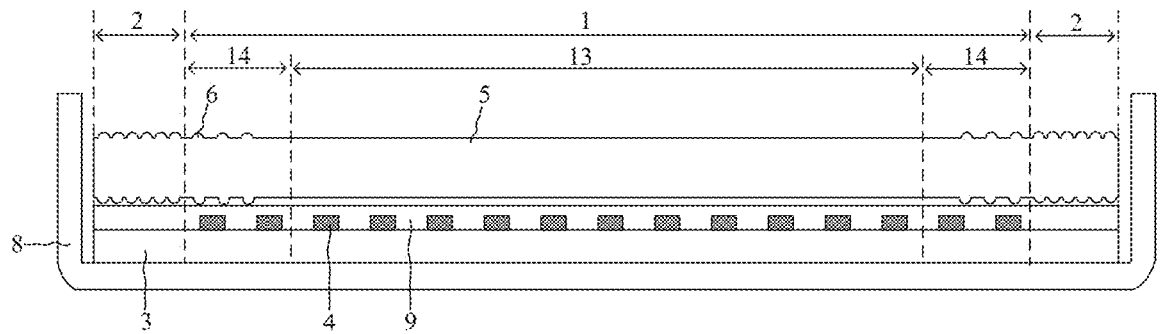
FIG. 14 is yet another schematic structural diagram of a backlight module according to an embodiment of the present disclosure.

FIG. 14 is yet another schematic structural diagram of a backlight module according to an embodiment of the present disclosure. The first region 1 includes a middle region 13 and an edge region 14 surrounding the middle region 13. The scattering dots 6 are located in the edge region 14. In addition, within the unit projected area, an area of orthographic projection of the scattering dots 6 in the edge region 14 is smaller than an area of orthographic projection of the scattering dots 6 in the second region 2.

When the first region 1 is provided with scattering dots 6, the scattering dots 6 in the first region 1 are arranged only in the edge region 14, so that the original natural light mixing in the middle region 13 can be prevented from being affected. In addition, compared with the second region 2, in the edge region 14, more light is emitted from the light source 4. Therefore, through further setting of the area of the orthographic projection of the scattering dots 6 in the edge region 14 within the unit projected area to be smaller, on the one hand, overcompensation for the light exit brightness at the edge position of the first region 1 can be avoided, and on other hand, impact on the original light mixing in the edge region 14 can be reduced.

Figure 15:
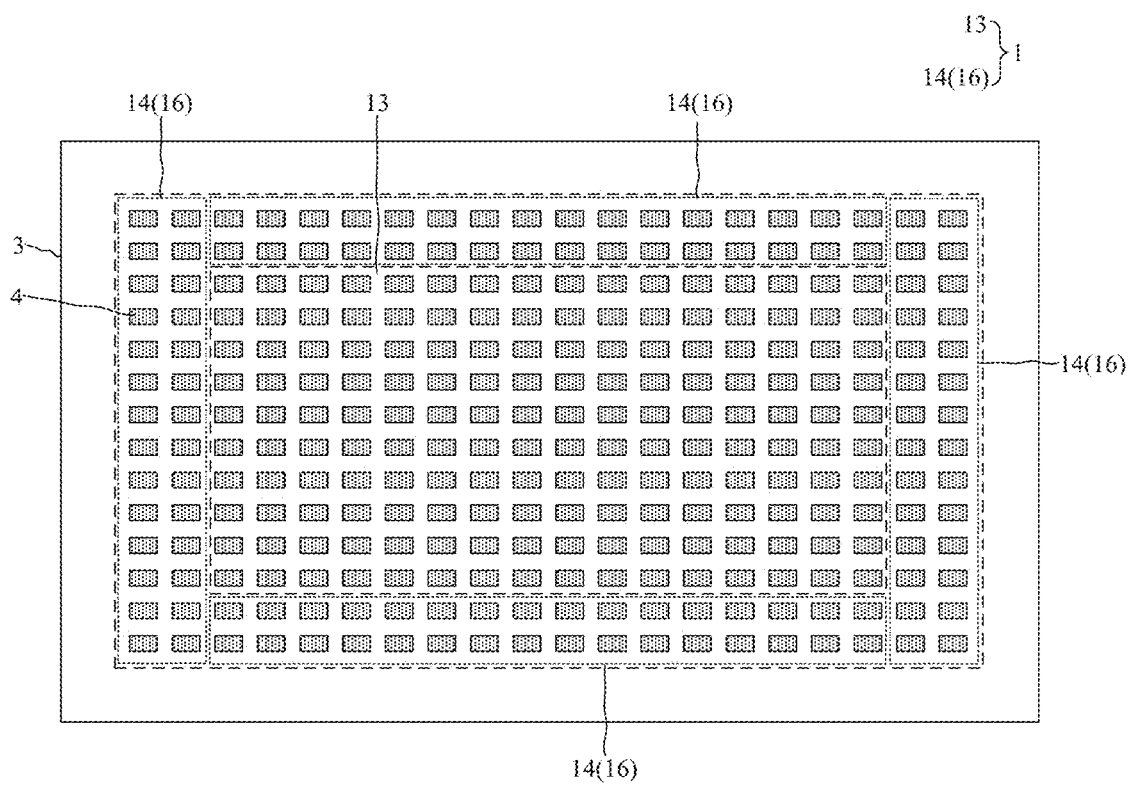
FIG. 15 is a top view of a backlight module according to an embodiment of the present disclosure.

FIG. 15 is a top view of a backlight module according to an embodiment of the present disclosure. The edge region 14 includes a plurality of edge sub-regions 16 communicating in sequence. Within the edge sub-region 16, at most three light sources 4 are arranged in a direction intersecting an extension direction of the edge sub-region 16, to avoid an extremely large area of an edge light exit region. In addition, impact on light mixing in the first region 1 is reduced while edge brightness is improved by using the scattering dots in the first region 1.

Figure 16:
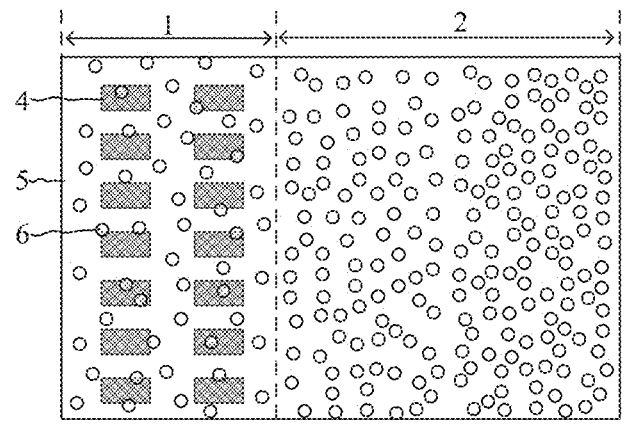
FIG. 16 is another partial top view of a backlight module according to an embodiment of the present disclosure.

FIG. 16 is another partial top view of a backlight module according to an embodiment of the present disclosure. The scattering dots 6 are located in the first region 1 and the second region 2. In a direction perpendicular to a plane of the backlight module, distribution density of the orthographic projection of the scattering dots 6 in the first region 1 is smaller than distribution density of the orthographic projection of the scattering dots 6 in the second region 2, to achieve differentiated settings of the areas of the orthographic projection of the scattering dots 6 in the first region 1 and the orthographic projection of the scattering dots 6 in the second region 2 within the unit projected area.

Figure 17:
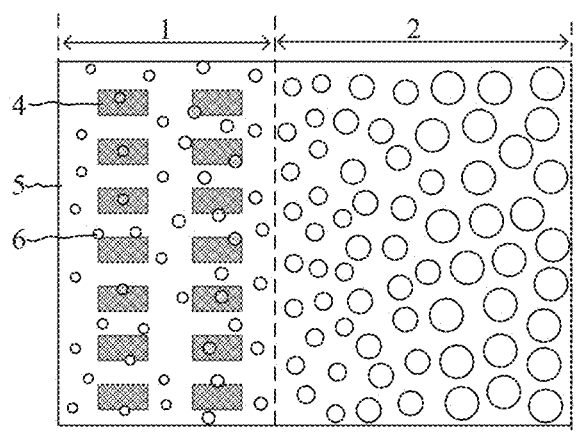
FIG. 17 is still another partial top view of a backlight module according to an embodiment of the present disclosure.

FIG. 17 is still another partial top view of a backlight module according to an embodiment of the present disclosure. The scattering dots 6 are located in the first region 1 and the second region 2. Sizes of the scattering dots 6 in the first region 1 are smaller than sizes of the scattering dots 6 in the second region 2, to achieve differentiated settings of the areas of the orthographic projection of the scattering dots 6 in the first region 1 and the orthographic projection of the scattering dots 6 in the second region 2 within the unit projected area.

Figure 18:
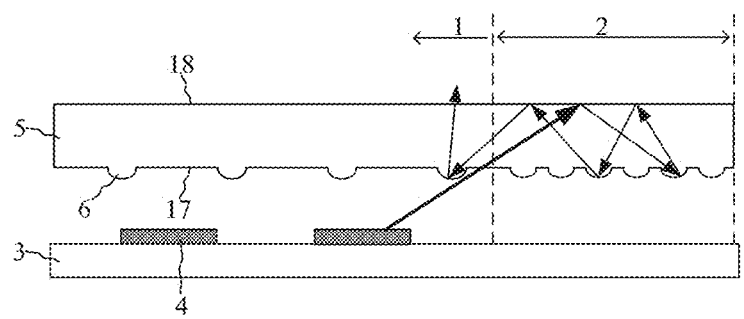
FIG. 18 is another partial schematic structural diagram of a backlight module according to an embodiment of the present disclosure.
Figure 19:
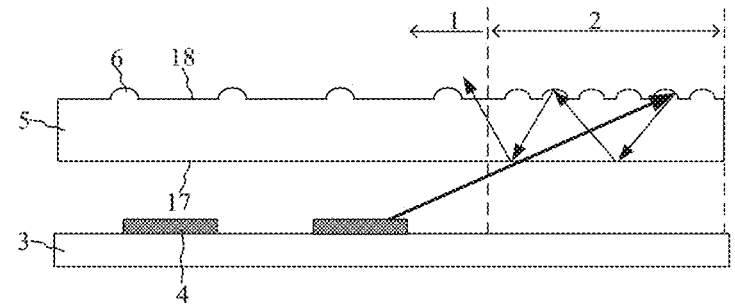
FIG. 19 is still another partial schematic structural diagram of a backlight module according to an embodiment of the present disclosure.
Figure 20:
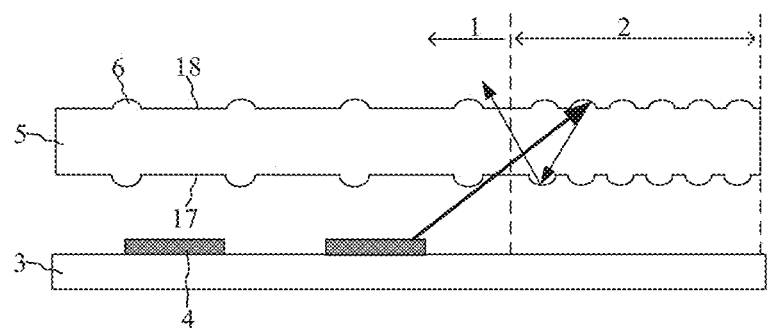
FIG. 20 is yet another partial schematic structural diagram of a backlight module according to an embodiment of the present disclosure.

FIG. 18 is another partial schematic structural diagram of a backlight module according to an embodiment of the present disclosure, FIG. 19 is still another partial schematic structural diagram of a backlight module according to an embodiment of the present disclosure, and FIG. 20 is yet another partial schematic structural diagram of a backlight module according to an embodiment of the present disclosure. The first structure 5 includes a bottom surface 17 close to the backplate 3 and a top surface 18 away from the backplate 3. The scattering dots 6 are located on the bottom surface 17 and/or the top surface 18.

In such an arrangement, the scattering dots 6 at the bottom surface 17 of the first structure 5 can reflect the light transmitted in the first structure 5 towards the backplate 3, so that this part of light is reflected back to the interior of the first structure 5 and continuous to be transmitted in the interior of the first structure 5. Similarly, the optical dots at the top surface 18 of the first structure 5 can reflect the light that is transmitted away from the backplate 3 in the first structure 5, so that this part of light is reflected back to an interior of the first structure 5 and continues to be transmitted in the interior of the first structure 5, and at least part of the adjusted light is transmitted all the way to the first region 1 and finally emitted from the edge position of the first region 1.

With reference to the FIG. 15, the first region 1 includes a middle region 13 and an edge region 14 surrounding the middle region 13. There is a brightness difference between light exit brightness of the edge region 14 and light exit brightness of the middle region 13. The brightness difference is smaller than or equal to 17% of the light exit brightness of the middle region 13. For example, in the prior art, the light exit brightness of the middle region 13 reaches 90%, but the light exit brightness of the edge region 14 can reach only 55%. After the application of the technical solution provided in this embodiment of the present disclosure, the light exit brightness of the edge region 14 by using scattering dots 6 can be increased to 75% to 80%. In this case, the brightness difference between the light exit brightness of the edge region 14 and the light exit brightness of the middle region 13 falls within 11% to 17% of the light exit brightness of the middle region 13.

Figure 21:
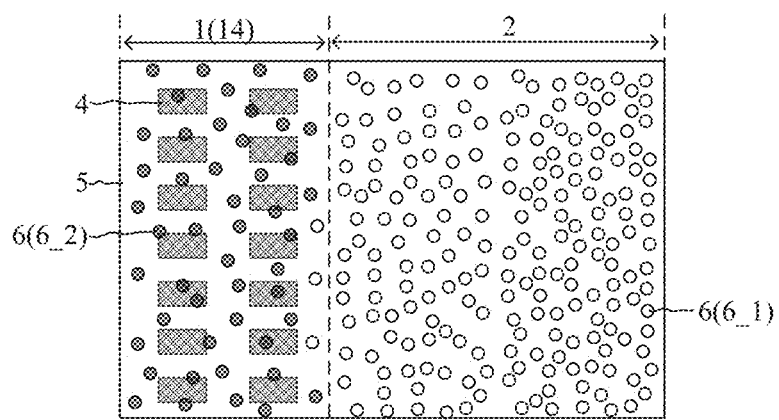
FIG. 21 is yet another partial top view of a backlight module according to an embodiment of the present disclosure.

In this embodiment of the present disclosure, the scattering dots 6 in the first structure 5 may include one or more types of dots. For example, in an arrangement, as shown in FIG. 21, some diffusion dots 6_1 that are not used to converge light with a large angle may be provided in the second region 2, while some light concentration dots 6_2 used to converge light with a large angle into light with a small angle may be provided in the edge region 14 of the first region 1. Such a design can increase light exit brightness at the edge position of the first region 1 at a front viewing angle and is more suitable for a display device with anti-peeping performance. Certainly, in other optional arrangements, only dots that are not used to converge light with a large angle may alternatively be arranged in the first structure 5.

Figure 22:
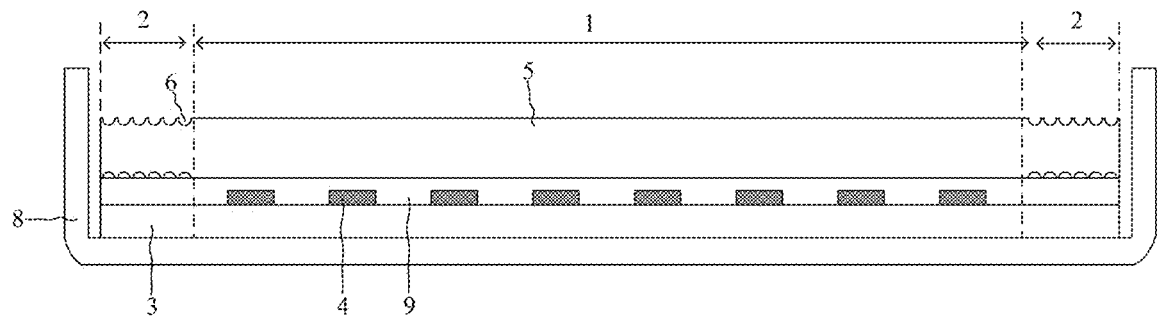
FIG. 22 is yet another schematic structural diagram of a backlight module according to an embodiment of the present disclosure.

FIG. 22 is yet another schematic structural diagram of a backlight module according to an embodiment of the present disclosure. At least some of the scattering dots 6 are recessed towards an interior of the first structure 5, and/or referring to FIG. 3 and FIG. 4 again, at least some of the scattering dots 6 protrude towards one side of the backplate 3. When the scattering dots 6 are each in a form of a concave microstructure or a convex microstructure, the transmission path of the light that is transmitted to and then reflected by the scattering dots 6 may be changed to achieve the adjustment of a transmission direction of the light.

Figure 23:
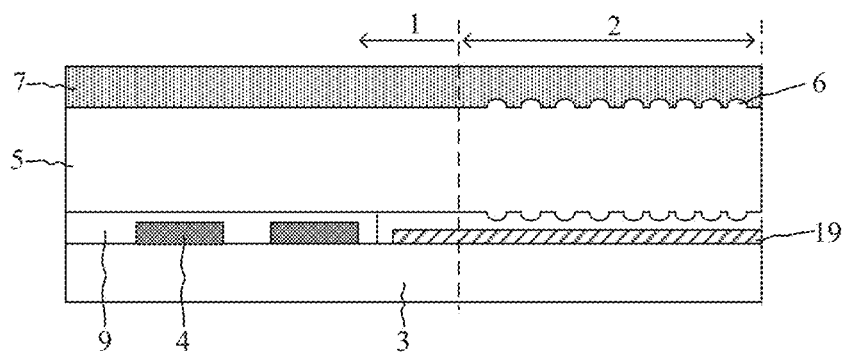
FIG. 23 is yet another partial schematic structural diagram of a backlight module according to an embodiment of the present disclosure.

FIG. 23 is yet another partial schematic structural diagram of a backlight module according to an embodiment of the present disclosure. The backlight module further includes a first reflective structure 19. The first reflective structure 19 is located at a side of the first structure 5 facing the backplate 3 and located in the second region 2 and the first region 1. In a direction perpendicular to a plane of the backlight module, orthographic projection of the light source 4 that is located at an outermost side and that is of orthographic projection of the first reflective structure 19 points to one side of the second region 2.

After scattering dots 6 are arranged, the scattering dots 6 break total reflection of part of the light and refract the light out, but light that is refracted out in the second region 2 causes a waste of light rays. In view of this, in this embodiment of the present disclosure, the first reflective structure 19 is arranged on the side of the first structure 5 facing the backplate 3, so that the first reflective structure 19 can reflect light that would be originally refracted through the bottom of the first structure 5 and wasted back into the first structure 5 to achieve reuse of light rays. In addition, the first reflective structure 19 not only is located in the second region 2, but also extends to the first region 1 without shielding the light source 4. In this way, a reuse rate of light can be increased to a greater extent without affecting normal light exit from the light source 4.

Figure 24:
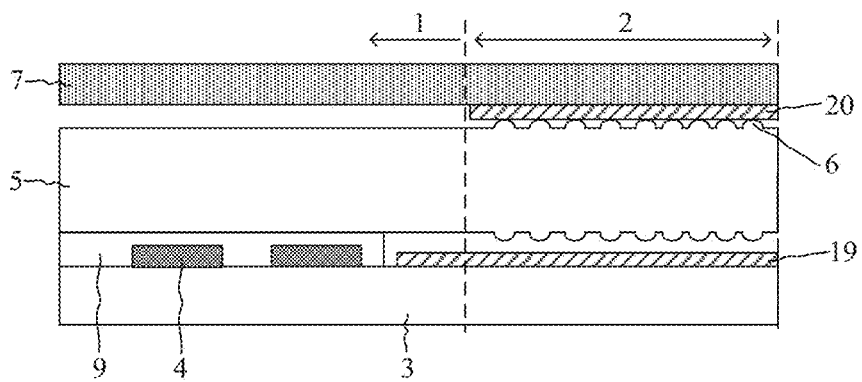
FIG. 24 is yet another partial schematic structural diagram of a backlight module according to an embodiment of the present disclosure.

FIG. 24 is yet another partial schematic structural diagram of a backlight module according to an embodiment of the present disclosure. The backlight module further includes a second reflective structure 20. The second reflective structure 20 is located at a side of the first structure 5 away from the backplate 3 and located in the second region 2.

Similar to the first reflective structure 19, the second reflective structure 20 is arranged on the side of the first structure 5 away from the backplate 3, so that the second reflective structure 20 can reflect light that would be refracted through the top of the first structure 5 and wasted back into the first structure 5 to improve utilization of light rays. In addition, the second reflective structure 20 is located only in the second region 2 and does not extend into the first region 1, so that shielding of light emitted from the edge of the light exit region can be reduced.

Figure 25:
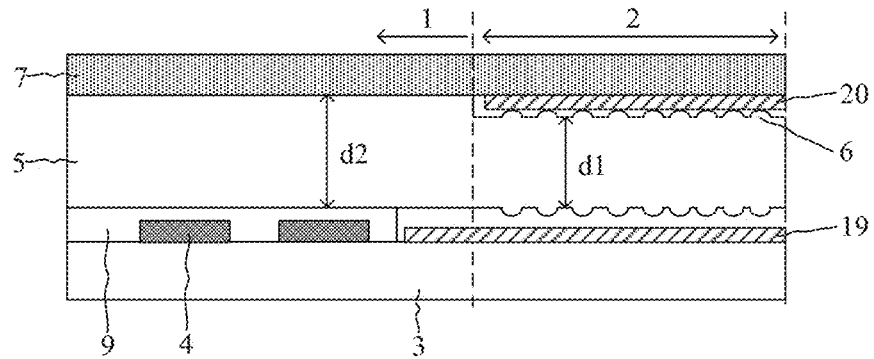
FIG. 25 is yet another partial schematic structural diagram of a backlight module according to an embodiment of the present disclosure.

FIG. 25 is yet another partial schematic structural diagram of a backlight module according to an embodiment of the present disclosure. A thickness d2 of a part of the first structure 5 located in the second region 2 is smaller than a thickness d1 of a part of the first structure 5 located in the first region 1. In this case, the first structure 5 is designed in a stepped shape in the second region 2, so that this part of space obtained by thinning the first structure 5 can be used to accommodate the second reflective structure 20, thereby preventing the second reflective structure 20 from pushing up a film above and causing unevenness.

Figure 26:
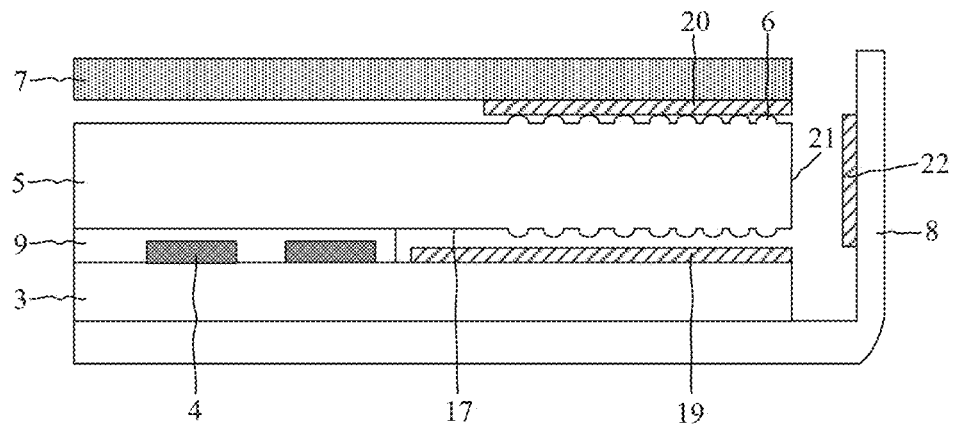
FIG. 26 is yet another partial schematic structural diagram of a backlight module according to an embodiment of the present disclosure.

FIG. 26 is yet another partial schematic structural diagram of a backlight module according to an embodiment of the present disclosure. The first structure 5 includes a bottom surface 17 close to the backplate 3 and a sidewall 21 intersecting the bottom surface 17. The backlight module further includes a third reflective structure 22. The third reflective structure 22 is located at a side of the sidewall 21 of the first structure 5.

Similarly, the third reflective structure 22 is arranged on the side of the sidewall 21 of the first structure 5, so that the third reflective structure 22 can reflect light that would be refracted through a side face of the first structure 5 and wasted back into the first structure 5, thereby improving utilization of light rays and helping optimize the compensation for edge brightness.

It should be noted that, in this embodiment of the present disclosure, the third reflective structure 22 may be arranged in the frame body 8 at a position opposite to the sidewall 21, or the third reflective structure 22 may be directly arranged on the sidewall 21 of the first structure 5.

Figure 27:
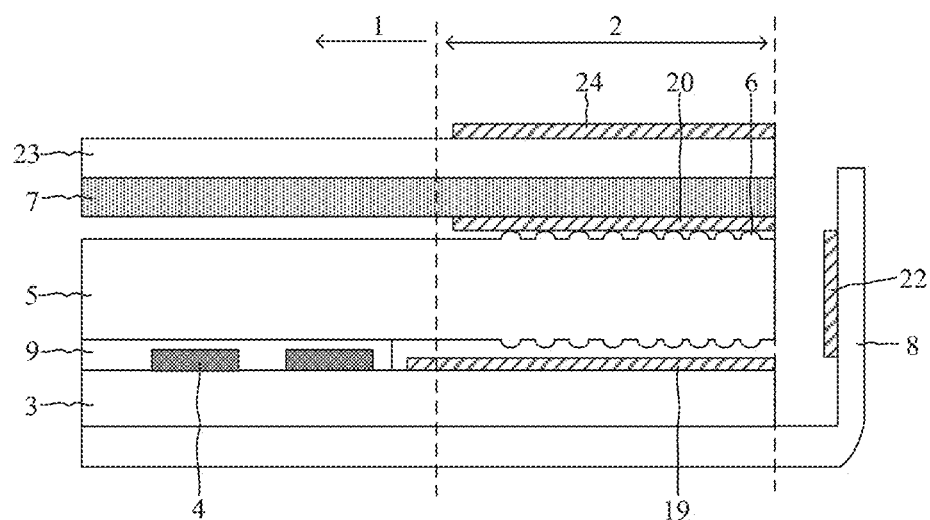
FIG. 27 is yet another partial schematic structural diagram of a backlight module according to an embodiment of the present disclosure.

FIG. 27 is yet another partial schematic structural diagram of a backlight module according to an embodiment of the present disclosure. The backlight module further includes an optical film 23 and a fourth reflective structure 24. The optical film 23 is located at a side of the first structure 5 away from the backplate 3 and close to a light exiting surface of the backlight module and also located in the first region 1 and the second region 2. In this embodiment of the present disclosure, the optical film 23 may be located at a side of the diffusion plate 7 away from the backplate 3. The optical film 23 may specifically include a diffusion film, a brightness enhancement film, a privacy film, and other structures. The fourth reflective structure 24 is located at a side of the optical film 23 away from the backplate 3 and located in the second region 2.

The fourth reflective structure 24 is arranged above the optical film 23, so that the fourth reflective structure 24 can reflect light that would be refracted through a part of the optical film 23 in the second region 2 and wasted or part of stray light back into the first structure 5 to improve utilization of light rays.

Figure 28:
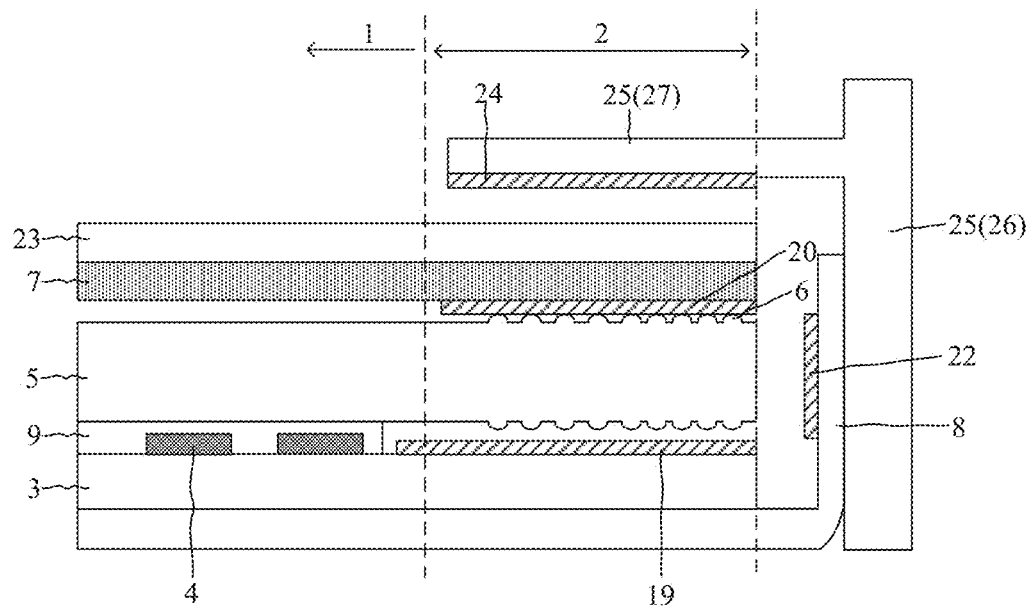
FIG. 28 is yet another partial schematic structural diagram of a backlight module according to an embodiment of the present disclosure.

It should be noted that, in this embodiment of the present disclosure, referring to FIG. 27 again, the fourth reflective structure 24 may be directly disposed on the optical film 23, or as shown in FIG. 28, the backlight module may further include a support structure 25 for supporting the liquid crystal display panel. The support structure 25 includes a body portion 26 and a support portion 27. The body portion 26 is located outside the frame body 8. The support portion 27 extends into the second region 2 above the optical film 23 for supporting the liquid crystal display panel. The fourth reflective structure 24 may alternatively be disposed on a surface of the support portion 27 facing the optical film 23.

In addition, it should also be noted that, the first reflective structure 19, the second reflective structure 20, the third reflective structure 22, and the fourth reflective structure 24 each may be an attached reflective sheet, or may be a reflective layer formed by spraying. In addition, the reflective structure may be a white reflective structure or a silver reflective structure.

Figure 29:
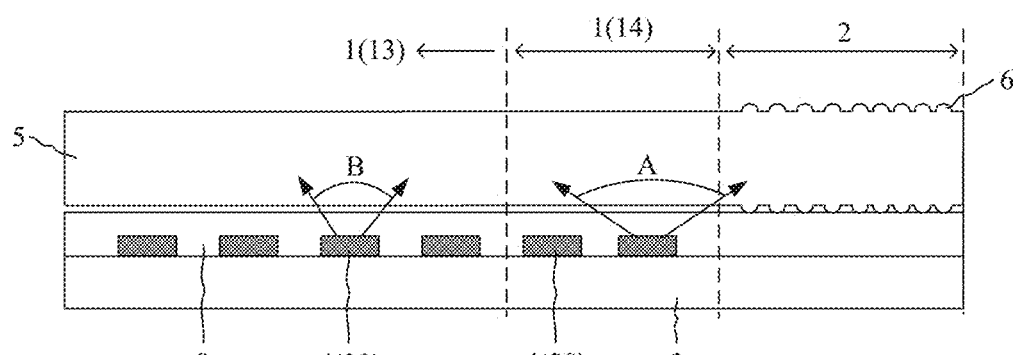
FIG. 29 is yet another partial schematic structural diagram of a backlight module according to an embodiment of the present disclosure.

In a feasible implementation, as shown in FIG. 29, FIG. 29 is yet another partial schematic structural diagram of a backlight module according to an embodiment of the present disclosure. The first region 1 includes a middle region 13 and an edge region 14 surrounding the middle region 13. The light source 4 include a first light source 28 located in the middle region 13 and a second light source 29 located in the edge region 14. A light exit angle A of the second light source 29 is greater than a light exit angle B of the first light source 28. For example, the light exit angle B of the first light source 28 may be 120° or 140°, and the light exit angle A of the second light source 29 may be 165° or 180°.

When the second light source 29 in the edge light exit region has a larger light exit angle, more large-angled light is transmitted towards the second region 2, increasing an amount of light that can be incident to the second region 2. After this part of light is adjusted by the scattering dots 6, the intensity of the light transmitted in the second region 2 can be increased, so that more light can be finally emitted from the edge position of the first region 1.

Figure 30:
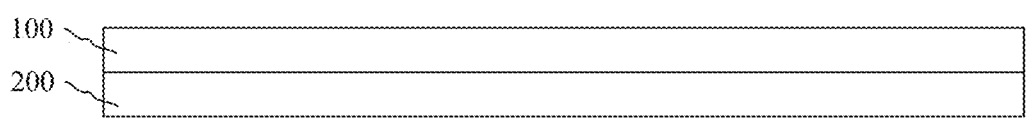
FIG. 30 is a schematic structural diagram of a display device according to an embodiment of the present disclosure.

Based on a same inventive concept, an embodiment of the present disclosure further provides a display device. As shown in FIG. 30, FIG. 30 is a schematic structural diagram of a display device according to an embodiment of the present disclosure. The display device includes the foregoing liquid crystal display panel 100 and the foregoing backlight module 200. A specific structure of the backlight module 200 has been described in detail in the foregoing embodiments. Details are not described herein again. Certainly, the display device shown in FIG. 30 is for schematic description only. The display device may be any electronic device with a display function, such as a mobile phone, a tablet computer, a notebook computer, an ebook, or a television.

The above descriptions are merely preferred examples of the present disclosure, and are not intended to limit the present disclosure. Any modifications, equivalent replacements, improvements, and the like made within the spirit and principle of the present disclosure shall fall within the protection scope of the present disclosure.

Finally, it should be noted that the above embodiments are merely intended to describe the technical solutions of the present disclosure, rather than to limit the present disclosure. Although the present disclosure is described in detail with reference to the above embodiments, persons of ordinary skill in the art should understand that they may still make modifications to the technical solutions described in the above embodiments or make equivalent replacements to some or all technical features thereof, without departing from the essence of the technical solutions in the embodiments of the present disclosure.

What is claimed is:

1. A backlight module, comprising:
   a first region;
   a second region surrounding the first region;
   a backplate;
   a light source located at a side of the backplate pointing to a light exiting direction of the backlight module and located in the first region; and
   a first structure located at a side of the light source facing away from the backplate, wherein the first structure comprises scattering dots;
   wherein the scattering dots are located in the first region and the second region, and an area of an orthographic projection of the scattering dots in the first region is smaller than an area of an orthographic projection of the scattering dots in the second region within a unit projected area, or
   wherein the scattering dots are located in the second region; and
   wherein at least some of the scattering dots are recessed towards an interior of the first structure, and/or at least some of the scattering dots protrude towards one side of the backplate.

2. The backlight module according to claim 1, wherein the second region comprises a first sub-region and a second sub-region, the first sub-region is located at a side of the second sub-region adjacent to the first region, and an area of the orthographic projection of the scattering dots in the second sub-region is larger than an area of the orthographic projection of the scattering dots in the first sub-region in a direction perpendicular to a plane of the backlight module and within the unit projected area.

3. The backlight module according to claim 2, wherein the area of the orthographic projection of the scattering dots in the second region gradually increases in the direction perpendicular to the plane of the backlight module, along a direction from the first region to the second region, and within the unit projected area.

4. The backlight module according to claim 1, further comprising: a diffusion plate located at a side of the light source facing away from the backplate,
wherein the first structure is located between the diffusion plate and the light source, and is located in the first region and the second region.

5. The backlight module according to claim 1, wherein the first structure comprises a diffusion plate, and the diffusion plate is located at a side of the light source facing away from the backplate, and is located in the first region and the second region.

6. The backlight module according to claim 1, wherein the first region comprises a middle region and an edge region surrounding the middle region;
wherein the backlight module further comprises a diffusion plate, and the diffusion plate is located at a side of the light source facing away from the backplate; and
wherein the first structure is located between the diffusion plate and the backplate, the first structure comprises a hollow portion, and the hollow portion exposes the middle region.

7. The backlight module according to claim 1, wherein the first region comprises a middle region and an edge region surrounding the middle region, the scattering dots are located in the edge region, and an area of an orthographic projection of the scattering dots in the edge region is smaller than an area of orthographic projection of the scattering dots in the second region within the unit projected area.

8. The backlight module according to claim 7, wherein the edge region comprises edge sub-regions communicated with each other in sequence, and three or fewer light sources are arranged in a direction intersecting an extension direction of the edge sub-region within the edge sub-region.

9. The backlight module according to claim 1, wherein the scattering dots are located in the first region and the second region, and a distribution density of the orthographic projection of the scattering dots in the first region is smaller than a distribution density of the orthographic projection of the scattering dots in the second region in a direction perpendicular to a plane of the backlight module.

10. The backlight module according to claim 1, wherein the scattering dots are located in the first region and the second region, the scattering dots in the first region have smaller sizes than the scattering dots in the second region.

11. The backlight module according to claim 1, wherein the first structure comprises: a bottom surface adjacent to the backplate, and a top surface facing away from the backplate, and the scattering dots are located at the bottom surface and/or the top surface.

12. The backlight module according to claim 1, wherein the first region comprises a middle region and an edge region surrounding the middle region, a brightness difference between light exit brightness of the edge region and light exit brightness of the middle region, is smaller than or equal to 17% of the light exit brightness of the middle region.

13. The backlight module according to claim 1, further comprising: a first reflective structure, wherein the first reflective structure is located at a side of the first structure facing the backplate and located in the second region and the first region, and in a direction perpendicular to a plane of the backlight module, an orthographic projection of the first reflective structure is located at one side of an orthographic projection of the light source located at an outermost side, and the side of the orthographic projection of the light source points to the second region.

14. The backlight module according to claim 13, wherein the backlight module further comprises a second reflective structure, and the second reflective structure is located at a side of the first structure facing away from the backplate and located in the second region.

15. The backlight module according to claim 14, wherein a thickness of a part of the first structure located in the second region is smaller than a thickness of a part of the first structure located in the first region.

16. The backlight module according to claim 14, wherein the first structure comprises a bottom surface adjacent to the backplate, and a sidewall intersecting the bottom surface; and
wherein the backlight module further comprises a third reflective structure, and the third reflective structure is located at a side of the sidewall of the first structure.

17. The backlight module according to claim 1, further comprising:
an optical film, wherein the optical film is located at a side of the first structure facing away from the backplate and adjacent to a light exiting surface of the backlight module, and is located in the first region and the second region; and
a fourth reflective structure located at a side of the optical film facing away from the backplate and located in the second region.

18. The backlight module according to claim 1, wherein the first region comprises a middle region and an edge region surrounding the middle region; and
wherein, the light source comprise a first light source located in the middle region and a second light source located in the edge region, and a light exit angle of the second light source is greater than a light exit angle of the first light source.

19. A display device, comprising a liquid crystal display panel and a backlight module, wherein the backlight module comprises:
a first region;
a second region surrounding the first region;
a backplate;
a light source located at a side of the backplate pointing to a light exiting direction of the backlight module and located in the first region; and
a first structure located at a side of the light source facing away from the backplate, wherein the first structure comprises scattering dots;
wherein the scattering dots are located in the first region and the second region, and an area of an orthographic projection of the scattering dots in the first region is smaller than an area of an orthographic projection of the scattering dots in the second region within a unit projected area, or
wherein the scattering dots are located in the second region and wherein at least some of the scattering dots are recessed towards an interior of the first structure, and/or at least some of the scattering dots protrude towards one side of the backplate.

* * * * *